United States Patent
Nam et al.

(10) Patent No.: US 9,870,119 B2
(45) Date of Patent: Jan. 16, 2018

(54) COMPUTING APPARATUS AND METHOD FOR PROVIDING THREE-DIMENSIONAL (3D) INTERACTION

(71) Applicant: Samsung Electronics Co., Ltd., Suwon-si, Gyeonggi-do (KR)

(72) Inventors: Dong Kyung Nam, Yongin-si (KR); Hyoseok Hwang, Seoul (KR); Jingu Heo, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/947,913

(22) Filed: Nov. 20, 2015

(65) Prior Publication Data
US 2016/0147410 A1 May 26, 2016

(30) Foreign Application Priority Data
Nov. 25, 2014 (KR) .................. 10-2014-0165315

(51) Int. Cl.
| | |
|---|---|
| G06F 3/041 | (2006.01) |
| G06F 3/0481 | (2013.01) |
| G06F 3/01 | (2006.01) |
| G06F 3/0346 | (2013.01) |
| G06F 3/0362 | (2013.01) |
| G06F 3/00 | (2006.01) |

(52) U.S. Cl.
CPC .......... *G06F 3/04815* (2013.01); *G06F 3/005* (2013.01); *G06F 3/013* (2013.01); *G06F 3/017* (2013.01); *G06F 3/0346* (2013.01); *G06F 3/0362* (2013.01); *G06F 3/0414* (2013.01); *G06F 3/04812* (2013.01)

(58) Field of Classification Search
None
See application file for complete search history.

(56) References Cited

U.S. PATENT DOCUMENTS

| | | | |
|---|---|---|---|
| 2001/0050669 A1* | 12/2001 | Ogawa | .................. G06F 3/0425 345/156 |
| 2006/0036947 A1 | 2/2006 | Jelley et al. | |

(Continued)

FOREIGN PATENT DOCUMENTS

| | | |
|---|---|---|
| EP | 2650753 A2 | 10/2013 |
| JP | 2012-058896 A | 3/2012 |

(Continued)

OTHER PUBLICATIONS

Extended European Search Report for Application No. EP 15196334 dated Mar. 24, 2016.

*Primary Examiner* — Joseph Haley
(74) *Attorney, Agent, or Firm* — Harness, Dickey & Pierce, P.L.C.

(57) ABSTRACT

A computing apparatus for providing a three-dimensional (3D) interactive user experience (UX) is provided. The computing apparatus may include an object position estimator configured to calculate first coordinates recognized by a user as a position of a first point of an object in a stereoscopic image. The computing apparatus may include a pointing determiner configured to determine whether the user points to the first point based on the first coordinates and second coordinates, the second coordinates representing a pointing position of the user.

18 Claims, 20 Drawing Sheets

(56) References Cited

U.S. PATENT DOCUMENTS

| | | |
|---|---|---|
| 2011/0187706 A1 | 8/2011 | Vesely et al. |
| 2011/0260965 A1 | 10/2011 | Kim et al. |
| 2012/0005624 A1 | 1/2012 | Vesely |
| 2012/0262695 A1 | 10/2012 | Faul et al. |
| 2013/0022222 A1 | 1/2013 | Zschau et al. |
| 2013/0136302 A1 | 5/2013 | Nam et al. |
| 2013/0243258 A1 | 9/2013 | Hennessey et al. |
| 2015/0116204 A1* | 4/2015 | Kim ................. G06F 3/017 345/156 |
| 2016/0026243 A1* | 1/2016 | Bertram ............ G06F 3/013 345/156 |

FOREIGN PATENT DOCUMENTS

| | | |
|---|---|---|
| JP | 2013-124972 A | 6/2013 |
| KR | 2013-0090458 A | 8/2013 |
| WO | WO-2008/059614 A1 | 5/2008 |

* cited by examiner

<Button ON>

<Button OFF>

COMPUTING APPARATUS AND METHOD FOR PROVIDING THREE-DIMENSIONAL (3D) INTERACTION

CROSS-REFERENCE TO RELATED APPLICATION

This application claims the priority benefit of Korean Patent Application No. 10-2014-0165315, filed on Nov. 25, 2014, in the Korean Intellectual Property Office, the entire contents of which are incorporated herein by reference in its entirety.

BACKGROUND

1. Field

Example embodiments relate to an apparatus and/or method for providing a three-dimensional (3D) interaction effect between a user and a device, and more particularly, to a method and/or apparatus for processing an operation and a pointing input of a user to an image output from a 3D display device.

2. Description of the Related Art

A three-dimensional (3D) interactive technology may be used, for example, to provide a user experience (UX) that allows a user to select and move an object of a stereoscopic image.

SUMMARY

At least one example embodiment relates to a computing apparatus.

According to at least one example embodiment, the computing apparatus may include an object position estimator configured to calculate first coordinate values, based on a position of each of a left eye and a right eye of a user and a position of a first object point displayed on an image, the first coordinate values being recognized by the user as the position of the first object point, and a pointing determiner configured to determine whether a pointing position of the user corresponds to the first object point, based on the first coordinate values and second coordinate values representing the pointing position. The image may be a stereoscopic image comprising a right image and a left image. When a distance between the first coordinate values and the second coordinate values is less than a threshold, the pointing determiner may determine the pointing position to correspond to the first object point.

According to at least one example embodiment, the object position estimator may be configured to calculate, as the first coordinate values, coordinates of an intersection point at which a first straight line connecting the position of the left eye and a position of the first object point displayed on the left image intersects a second straight line connecting the position of the right eye and a position of the first object point displayed on the right image. When the first straight line and the second straight line do not intersect, the object position estimator may be configured to calculate, as the first coordinate values, coordinates of a central point of a line segment perpendicular to the first straight line and the second straight line.

According to at least one example embodiment, the computing apparatus may further include a pointing position estimator configured to calculate the second coordinate values, based on a position of at least one identification element associated with a user device. The at least one identification element may correspond to a plurality of markers, and the pointing position estimator may be configured to calculate the second coordinate values, based on directions of the plurality of markers recognized by image-sensing and displacement information between the plurality of markers. The pointing position estimator may be configured to correct a position of the at least one identification element sensed in a current frame, based on a position of the at least one identification element sensed in at least one previous frame, and configured to calculate the second coordinate values, based on the corrected position. The pointing position estimator may be configured to correct second coordinate values calculated in a current frame, based on second coordinate values calculated corresponding to at least one previous frame preceding the current frame. Additionally, the pointing position estimator may be configured to determine the corrected second coordinate values as the pointing position.

According to at least one example embodiment, the computing apparatus may further include a pointing position estimator configured to calculate the second coordinate values, based on a first shape and a second shape, the first shape being recognized by image-sensing of at least one identification element associated with a user device, and the second shape being given in advance as a shape of the at least one identification element. The at least one identification element may include a light source, or a light emitting element allowed by the light source to emit light. The light source or a light emitting element may be turned on or off by a switching operation of a switch included in the user device. Accordingly, the at least one identification element may be recognizable or unrecognizable based on an on state and an off state of the light source or the light emitting elements.

According to at least one example embodiment, the computing apparatus may further include a pointing position estimator configured to calculate a position of at least one identification element associated with a user device, and configured to calculate the second coordinate values based on a relative displacement between the pointing position and the at least one identification element. The relative displacement may be set, and may be changed by an operation of the user. For example, the operation of the user to change the relative displacement is identified by an operation of a wheel included in the user device, however, there is no limitation thereto. The operation of the user to change the relative displacement may also be identified by a sensing value of a pressure sensor included in the user device.

According to at least one example embodiment, the computing apparatus may include an object position estimator configured to determine a transformation function based on positions of eyes of a user, the transformation function being used to transform coordinate values of a first object point in a global coordinate system to first coordinate values in a user recognition coordinate system, and a pointing determiner configured to determine whether a pointing position corresponds to the first object point, based on the first coordinate values and second coordinate values representing the pointing position. When a distance between the first coordinate values and the second coordinate values is less than a threshold, the pointing determiner may determine the pointing position to correspond to the first object point.

According to at least one example embodiment, the computing apparatus may include an object position estimator configured to determine a transformation function based on positions of eyes of a user, the transformation function being used to transform coordinate values of a first object point in a global coordinate system to first coordinate values in a user recognition coordinate system, and a pointing determiner configured to determine third coordinate values in the global coordinate system by applying an inverse function of the transformation function to second coordinate values representing a pointing position, and to determine whether the pointing position corresponds to the first object point based on the first coordinate values and the third coordinate values.

At least one example embodiment relates to a method by which a computing apparatus including at least one processor provides a three-dimensional (3D) interactive user experience (UX).

According to at least one example embodiment, the method may include calculating first coordinate values, based on positions of eyes of a user and a position of a first object point displayed on an image, the first coordinate values being recognized by the user as the position of the first object point, calculating second coordinate values representing a pointing position of the user, and determining whether the pointing position corresponds to the first object point based on the first coordinate values and the second coordinate values. The pointing position and the positions of the eyes may be calculated from an image captured by a single camera. The calculating of the second coordinate values may include calculating the second coordinate values, based on a position of at least one identification element associated with a user device. The calculating of the second coordinate values may include correcting a position of the at least one identification element sensed in a current frame, based on a position of the at least one identification element sensed in at least one previous frame, and calculating the second coordinate values, based on the corrected position.

According to at least one example embodiment, a device includes an object position estimator configured to estimate a position of an object point on an image based on i) a position of each of a left eye and a right eye of a user in a user coordinate system, and ii) a position of the object point in a global coordinate system. The user coordinate system is from a different perspective than the global coordinate system. The device includes a pointing determiner configured to determine whether a pointing position of the user corresponds to the object point based on the estimated position.

According to at least one example embodiment, the user coordinate system is from the perspective of user and the global coordinate system is from the perspective of a display displaying the image.

According to at least one example embodiment, the image is a stereoscopic image comprising a right image and a left image. The object position estimator is configured to determine, as the estimated position of the object point, coordinates of an intersection point at which a first straight line connecting the position of the left eye and a position of the object point on the left image intersects a second straight line connecting the position of the right eye and a position of the object point on the right image. If the first straight line and the second straight line do not intersect, the object position estimator is configured to determine, as the estimated position of the object point, coordinates of a central point of a line segment perpendicular to the first straight line and the second straight line.

According to at least one example embodiment, if a difference between the estimated position of the object point and the pointing position is less than a threshold, the pointing position determiner is configured to determine that the pointing position corresponds to the object point, and to initiate a user desired operation on the object point.

According to at least one example embodiment, the device includes a camera configured to capture the position of each of a left eye and a right eye of the user and the pointing position of the user.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION OF EXAMPLE EMBODIMENTS

Figure 1:
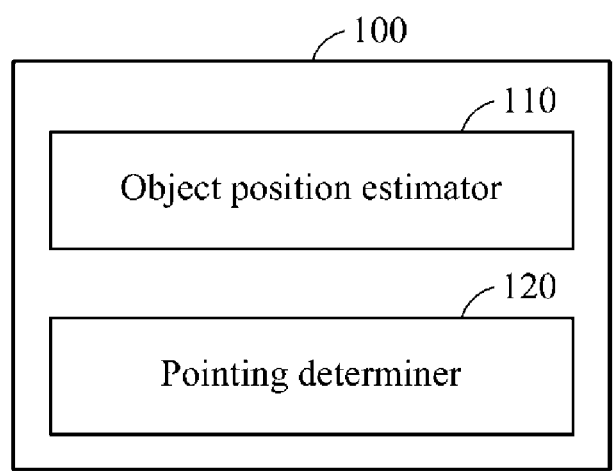
FIG. 1 is a block diagram illustrating an example of a computing apparatus according to at least one example embodiment.

Reference will now be made in detail to embodiments, examples of which are illustrated in the accompanying drawings, wherein like reference numerals refer to like elements throughout. Example embodiments are described below to explain the present disclosure by referring to the figures.

In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Hereinafter, some embodiments will be described in detail with reference to the accompanying drawings. The scope of the right may, however, should not be construed as limited to the embodiments set forth herein. Regarding the reference numerals assigned to the elements in the drawings, it should be noted that the same elements will be designated by the same reference numerals.

Also, terms used herein are selected from general terms being used in the related arts. Yet, the meanings of the terms used herein may be changed depending on a change and/or development of technologies, a custom, or preference of an operator in the art. Accordingly, the terms are merely examples to describe the example embodiments, and should not be construed as limited to the present disclosure.

In addition, in a specific case, most appropriate terms are arbitrarily selected by the applicant for ease of description and/or for ease of understanding. In this instance, the meanings of the arbitrarily used terms will be clearly explained in the corresponding description. Hence, the terms should be understood not by the simple names of the terms but by the meanings of the terms and the following overall description of this specification.

FIG. 1 is a block diagram illustrating a computing apparatus 100 according to at least one example embodiment.

Referring to FIG. 1, the computing apparatus 100 may include an object position estimator 110, and a pointing determiner 120. The object position estimator 110 may calculate a position of an object recognized by a user, based on positions of eyes of the user and a position of an object point displayed on an image. The image may be, for example, a stereoscopic image. The position of the object point displayed on the image may correspond to a position of a desired (or alternatively, predetermined) point displayed on each of a left image and a right image of a stereoscopic image. Additionally, the position of the eyes of the user may be calculated from an image representing human eyes captured by a camera. The computing apparatus 100 may further include an estimator (not shown) configured to estimate positions of user's eyes. Estimation of a position of an object will be further described with reference to FIGS. 3, 4A and 4B. The computing apparatus 100 may be, for example, a special purpose processor executing instructions stored on a memory.

The pointing determiner 120 may calculate a pointed position by comparing a pointing position of the user to the position of the object position. For example, when a distance between a first point and a second point representing the pointing position among object points is less than a threshold, based on spatial coordinate values, the first point may be determined to be pointed to. The pointing position may be, for example, a value separately calculated and provided to the computing apparatus 100. Additionally, the pointing position may be estimated by recognizing a pointing device held or worn by a user's hand, which will be further described with reference to FIGS. 5A through 9B.

Determining a scheme by which object coordinates provided in a stereoscopic image are recognized from a user viewpoint may be understood as a coordinate movement or coordinate transformation. Fixed coordinates may be referred to as global coordinates. For example, fixed coordinates with a central point of a display screen as the origin and a normal direction as a z-axis direction may be considered. That is, the fixed (or global) coordinates may be from the perspective of a display (e.g., the display 200 of FIG. 2 discussed below). A position of an object in a stereoscopic image at a desired (or alternatively, predetermined) point in time may have constant coordinate values in global coordinates. However, coordinate values of an object recognized by a user may change based on a viewing position of the user, which may be expressed as a user recognition coordinate system (or user coordinate system). That is, the user coordinate system may be from the perspective of the user, for example, the left eye and the right eye of the user. Accordingly, it may be understood that the object position estimator 110 may perform coordinate transformation to transform coordinate values of an object point in a global coordinate system to coordinate values in the user recognition coordinate system. Additionally, it may be understood that the pointing determiner 120 may determine a pointing position by comparing coordinate values of the pointing position to the transformed coordinate values.

When the object position estimator 110 determines a transformation function corresponding to the coordinate transformation, the pointing determiner 120 may search for a pointing position in the global coordinate system by applying an inverse function to the transformation function of the pointing position in the user recognition coordinate system. Additionally, whether pointing is performed may be determined by comparing the pointing position and the object point in the global coordinate system. Hereinafter, example embodiments will be further described.

Figure 2:
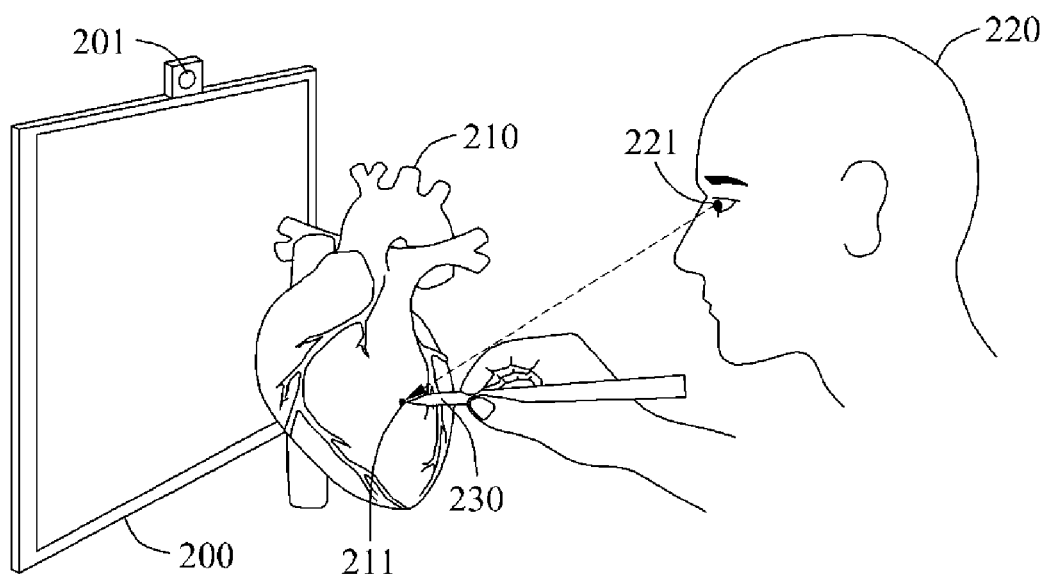
FIG. 2 illustrates an application of an apparatus for providing a user experience (UX) according to at least one example embodiment.

FIG. 2 illustrates an application of an apparatus for providing a user experience (UX) according to at least one example embodiment.

A stereoscopic image may be provided using a display 200, and various schemes of providing a stereoscopic image may be used. For example, a stereoscopic type scheme or a multi-view type scheme may be used. Additionally, a stereoscopic image providing scheme may be performed in both a glasses mode and a glasses-free mode. A three-dimensional (3D) image provided using the display 200 may include an object 210.

A user 220 may point to a desired (or alternatively, predetermined) point 211 using a pointing device 230. The above pointing input recognition may be applicable to selecting, moving, or rotating the object 210, or drawing a picture on the object 210. For example, in a medical field, interfacing, for example, designating or marking a desired (or alternatively, predetermined) blood vessel of a heart, or cutting a heart using remote surgical equipment may be possible. To activate and apply the above application to various fields, it may be important to accurately, elaborately recognize a position to which the user 220 points.

A position of the object 210 recognized by the user 220 may change, even though a stereoscopic image is provided based on the same input 3D image and disparity information. For example, the user 220 may recognize that the position of the object 210 changes due to a change in a position 221 of an eye of the user 220, even though a provided image remains static. The user 220 may need to recognize which portion of an actual object 210 is to be pointed to by the user 220, when desiring to point to the desired (or alternatively, predetermined) point 211 based on the position of the object 210 recognized by the user 220. A portion of the object 210 to which the user 220 is to point to may be determined based on a position of the pointing device 230 and positions of eyes of the user 220 identified by a single camera 201, which will be further described with reference to FIG. 3. For example, the camera 210 may be a color camera, a monotone camera, an infrared (or near-infrared) camera, or the like. It should be understood that the computing apparatus 100 of FIG. 1 may be incorporated into, for example, the camera 210 or the display 200.

Figure 3:
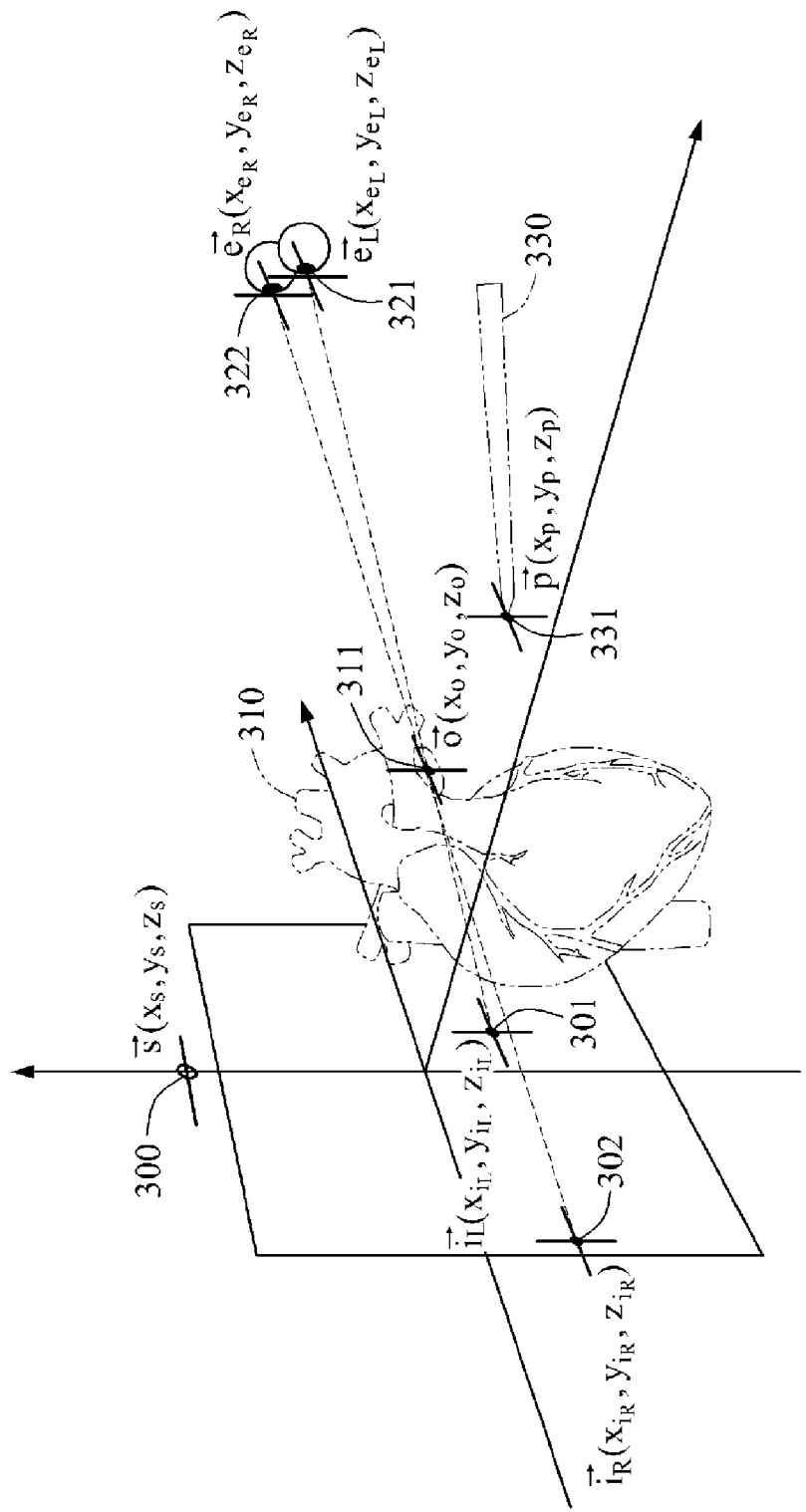
FIG. 3 illustrates a method of estimating a position of an object according to at least one example embodiment.

FIG. 3 illustrates a method of estimating a position of an object according to at least one example embodiment.

A stereoscopic image of FIG. 3 may correspond to the stereoscopic image of FIG. 2, and coordinate axes may be associated with a 3D coordinate system in which a center of a display screen is set as the origin. Position vectors of both eyes of a user may be recognized from a camera in a position 300. A position vector of a left eye 321 and a position vector of a right eye 322 may be expressed as eL and eR, respectively. A point 311 may be a point displayed in a position 301 on a left image and displayed in a position 302 on a right image. A position vector of the position 301 and a position vector of the position 302 may be expressed as iL and iR, respectively. The point 301 at the position vector iL may be viewed from the left eye 321, and the point 302 at the position vector iR may be viewed from the right eye 321 and accordingly, the user may recognize that an object is in a spatial position, for example, the point 311. A position vector of the point 311 may be expressed as o. The point 311 may be a portion of an object 310. Additionally, a position vector of a pointing position 331 input by the user using a pointing device 330 may be expressed as p.

The position vectors o and p may be estimated. A position pointed to by the user may be determined based on a relative position difference between the estimated position vectors o and p. Positions of the left eye 321 and the right eye 322 may be identified from an image captured by a single camera, and the position vectors eL and eR may be estimated. Two-dimensional (2D) coordinates of each of the left eye 321 and the right eye 322 in the image may be derived. The average inter pupil distance (IPD) of a human may be about 6 cm, even though an IPD may be slightly different based on sex, age, and race of the user. A value of the IPD may be used to determine the position vectors eL and eR based on the derived 2D coordinates. When the position vectors eL and eR are obtained, the position vector o may be obtained. The method of FIG. 3 will be further described with reference to FIGS. 4A and 4B.

Figure 4A:
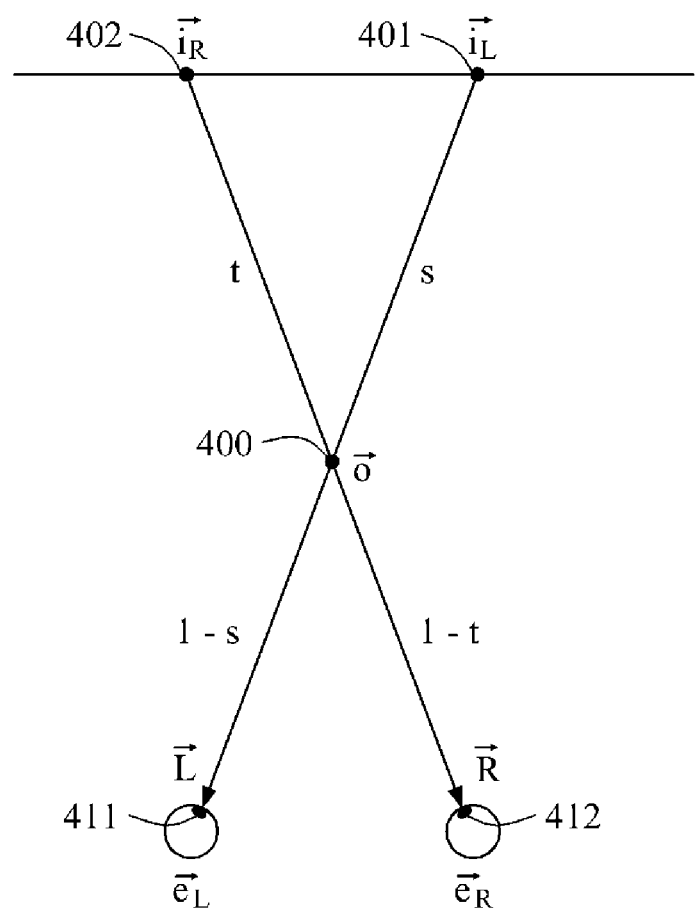
FIGS. 4A and 4B illustrate a process of estimating a position of an object according to at least one example embodiment.
Figure 4B:
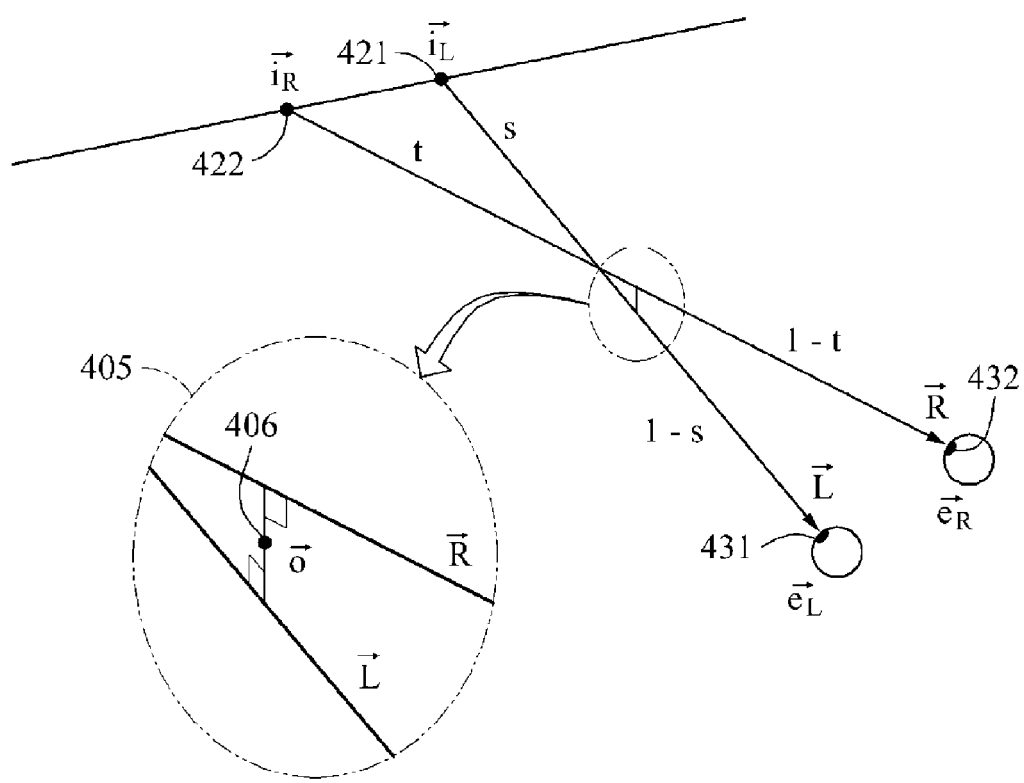

FIGS. 4A and 4B illustrate a process of estimating a position of an object according to at least one example embodiment.

In FIG. 4A, points 401 and 402 on an image, and points 411 and 412 corresponding to positions of both eyes may be on the same plane. When the points 401, 402, 411 and 412 are on the same plane, a first straight line connecting the points 401 and 411, and a second straight line connecting the points 402 and 412 may intersect at a single point 400. The point 400 may be an object point recognized by a human. Obtaining a position vector o of the object point using vectors L and R may be understood as solving Equations 1 and 2 shown below. The vector L may be obtained by subtracting a position vector $i_L$ of the point 401 from a position vector $e_L$ of the point 411, and the vector R may be obtained by subtracting a position vector $i_R$ of the point 402 from a position vector $e_R$ of the point 412.

$$\vec{i}_L + s\vec{L} = \vec{i}_R + t\vec{R} \quad \text{[Equation 1]}$$

$$\vec{o} = \vec{i}_L + s\vec{L} = \vec{i}_R + t\vec{R} \quad \text{[Equation 2]}$$

However, points on an image, and points corresponding to positions of both eyes may be on different planes. Referring to FIG. 4B, points 421 and 422 on an image, and points 431 and 432 corresponding to positions of both eyes are not on the same plane. As shown in a zoomed-in portion 405 of FIG. 4B, a first straight line connecting the points 421 and 431, and a second straight line connecting the points 422 and 432 may be in a skew position. Accordingly, a point 406 closest to the first straight line and the second straight line may be obtained and estimated as an object point. For example, a central point of a line segment that is perpendicular to both the first straight line and the second straight line may be estimated as an object point. Through the above process, obtaining of the position vector o of the object point may be understood as solving Equations 3 through 5 shown below.

$$((\vec{i}_L + s\vec{L}) - (\vec{i}_R + t\vec{R})) \cdot \vec{L} = 0 \quad \text{[Equation 3]}$$

$$((\vec{i}_L + s\vec{L}) - (\vec{i}_R + t\vec{R})) \cdot \vec{R} = 0 \quad \text{[Equation 4]}$$

$$\vec{o} = \tfrac{1}{2}(\vec{i}_L + s\vec{L} + \vec{i}_R + t\vec{R}) \quad \text{[Equation 5]}$$

When a position vector o of an object point for all points in an image is obtained, an exact position of a stereoscopic image recognized by a user may be determined, which may be understood as movement of coordinates of a position of an object determined by a left image and a right image from current positions of both eyes of a user to recognized positions. When the position vector o is estimated, whether the user points to the object point may be determined by comparing the estimated position vector o to a position vector p of a pointing position. A process of obtaining the position vector p will be further described with reference to FIG. 5A.

Figure 5A:
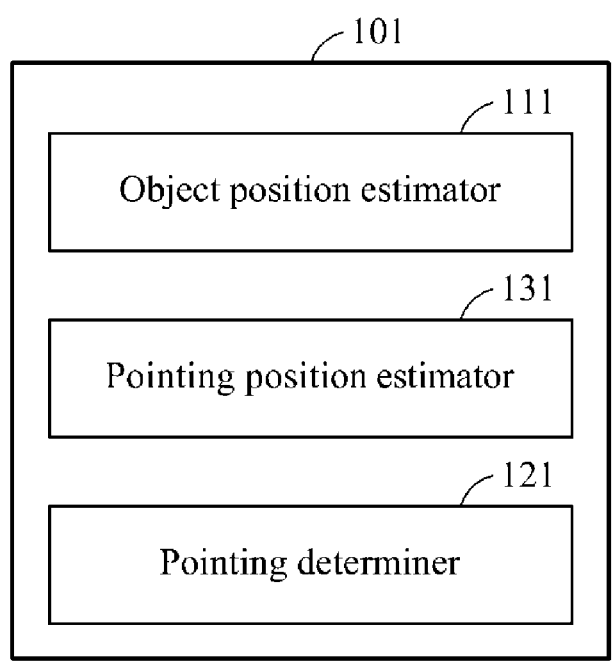
FIG. 5A is a block diagram illustrating another example of a computing apparatus according to at least one example embodiment.

FIG. 5A illustrates a computing apparatus 101 according to at least one example embodiment. It should be understood that the computing apparatus 101 may be incorporated into, for example, the camera 210 or the display 200. The computing apparatus 101 may be, for example, a special purpose processor executing instructions stored on a memory.

Referring to FIG. 5A, the computing apparatus 101 may include an object position estimator 111, a pointing determiner 121, and a pointing position estimator 131. Example embodiments or an operation of the object position estimator 111 may be the same as described above with reference to FIGS. 1, and 3 through 4B. The pointing determiner 121 may calculate a position pointed to by a user, by comparing a pointing position of the user to an object position. The pointing determiner 121 may accurately determine a position of an object to which the user points. For example, the pointing determiner 121 may determine, as a current pointing position, an object point within a threshold distance from a recognized pointing position (i.e., if a difference between a pointing position and an estimated position of the object point is less than a threshold, then the pointing determiner 121 determines that the pointing position corresponds to the object point). Then the pointing determiner 121 may initiate or send an instruction to initiate a user desired operation on the object point, such as selecting, moving, zooming, rotating, changing, splitting, grouping, deleting, etc. the object point. If the pointing determiner 121 determines that the pointing position and the object point do not correspond (i.e., a distance or difference is greater than or equal to the threshold), then the operations described with respect to FIG. 1 may be repeated, thereby continuously tracking the object point and the pointing position. An operation of the pointing determiner 121 has been described with reference to FIG. 1.

The computing apparatus 101 may include the pointing position estimator 131, as described above. The pointing position estimator 131 may calculate a position to which the user is currently pointing, using an identification element of a pointing device that recognizes an image. Various shapes of the pointing device, and calculating of a pointing position by the pointing position estimator 131 will be further described with reference to FIG. 5B.

It should be understood that the pointing position estimator 131 may correct a position of the identification element sensed in a current frame based on a position of the identification element sensed in at least one previous frame. The pointing position estimator 131 may calculate the coordinate values of the pointing position based on the corrected position. For example, the pointing position estimator 131 may determine a difference between a position of the identification element sensed in a previous frame and a position of the identification element sensed in the current frame and adjust the position of the identification element in the current frame based on the difference.

In at least one example embodiment, the pointing position estimator 131 may correct coordinate values of the pointing position calculated in a current frame based on coordinate values of the pointing position calculated in at least one previous frame preceding the current frame. The pointing position estimator 131 may determine the corrected coordinate values as the pointing position in the current frame. For example, the pointing position estimator 131 may determine a difference between coordinate values of the pointing position in the current frame and coordinate values of the pointing position in the previous frame and correct the coordinate values of the pointing position in the current frame based on the difference.

In at least one example embodiment, the pointing position estimator 131 may calculate the coordinate values of the pointing position by comparing a first shape and a second shape. The first shape may be recognized by an image-sensing device as at least one identification element associated with a user device. The second shape may be given (or known) in advance as a shape of the at least one identification element. For example, the pointing position estimator 131 may determine a difference(s) between the first and second shapes and calculate coordinate values of the pointing position based on the difference.

Figure 5B:
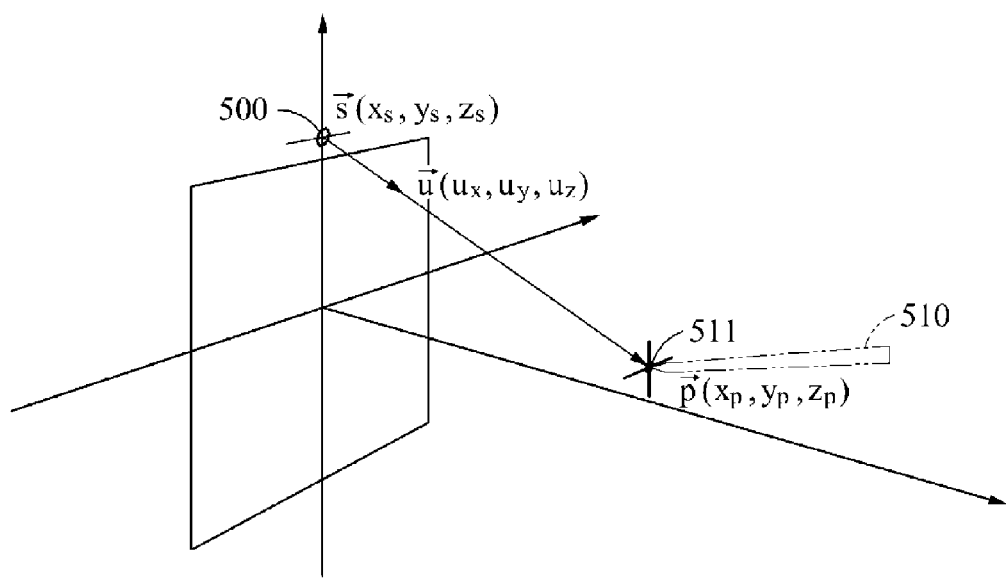
FIG. 5B illustrates a process of estimating a pointing position according to at least one example embodiment.

FIG. 5B illustrates a process of estimating a pointing position according to at least one example embodiment.

As described above, when a pointing device 510 is captured by a camera (e.g., camera 210 of FIG. 2) at a position 500, a position vector p of a pointing position 511 may be calculated by the pointing position estimator 131. When the camera captures the pointing device 510, a direction vector u from the position 500 to the pointing position 511 may be acquired. The pointing position 511 may be calculated based on the direction vector u, and the position vector p of the pointing position 511 may be obtained based on a position vector s of the camera. When at least two cameras are used, a 3D position of a pointer may be recognized, however, an issue of sophisticated calibration between the cameras may occur. Hereinafter, examples of obtaining the position vector p using given parameters, for example, the position vector s, and the direction vector u are provided.

FIGS. 6A through 6D illustrate a structure and an operation of a pointing device 600 according to at least one example embodiment.

Figure 6A:
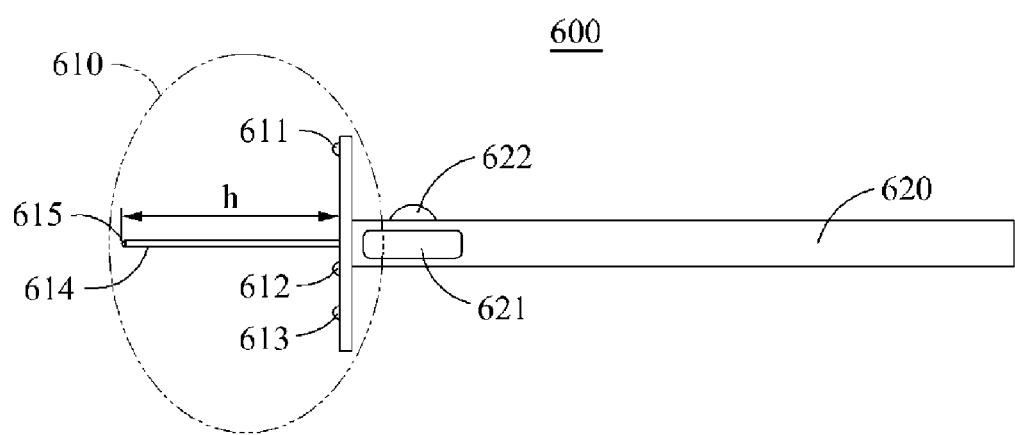
FIGS. 6A through 6D illustrate a structure and an operation of a pointing device according to at least one example embodiment.

FIG. 6A illustrates a side of the pointing device 600. The pointing device 600 may have a shape similar to a pen. A ring 630 to which markers 611, 612 and 613 are attached may be installed in a front portion of the pointing device 600, and a needle 614 for pointing may be positioned in front of the ring 630. A pointer 615, that is, a tip of the needle 614 may be recognized as a pointing position. The markers 611 through 613 and the pointer 615 may be implemented as an element, for example, a light emitting diode (LED). Additionally, the markers 611 through 613 or the pointer 615 may be identified using a fluorescent paint. The markers 611 through 613 may be disposed to maintain the same distance d. The needle 614 in the center of the markers 611 through 613 may be attached in a direction perpendicular to a plane passing through the markers 611 through 613, and the pointer 615 may be spaced apart from the ring 630 by a length h.

Figure 6B:
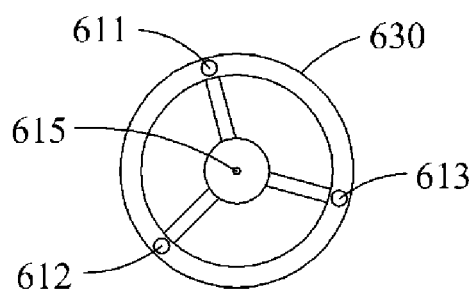
Figure 6C:
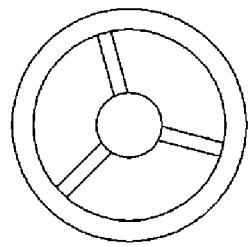

FIG. 6B illustrates a front side of the pointing device 600, and FIG. 6C illustrates a rear side of the pointing device 600. As shown in FIG. 6B, the markers 611 through 613 may be located on the ring 630 at regular intervals, and a position of the pointer 615 may be calculated through a displacement from positions of the markers 611 through 613. A process of calculating a position of the pointer will be further described with reference to FIGS. 7A and 7B.

Referring back to FIG. 6A, at least one button, for example, a button 621 may be attached to a pen holder 620.

The button 621 may be implemented, for example, by a mechanical switch to detect a click and/or by a touch-sensitive input module. By using the button 621, a user may perform an interaction, for example, selecting, marking, moving or rotating of an object in a 3D space, or cutting in a medical field. Also, the pointing device 600 may include a button 622 with a shape of a wheel. In an example, the button 622 may function as a wheel of a mouse to enable interaction of zooming in or out of a screen, or scrolling of content.

Figure 6D:
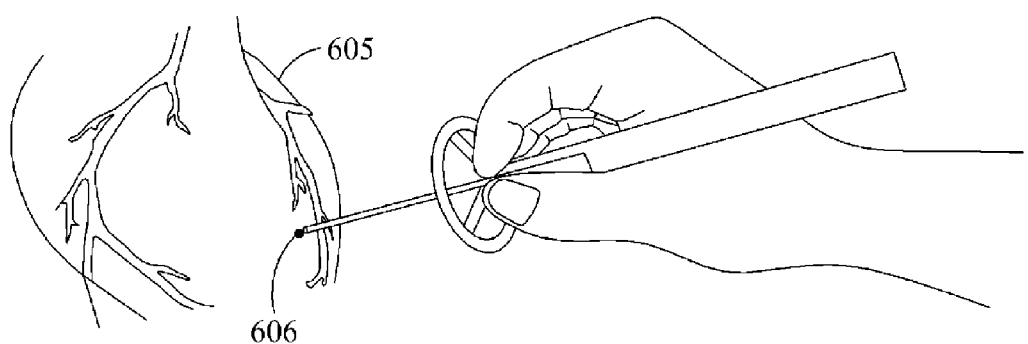

In another example, the button 622 may function to allow the user to adjust the position of the pointer 615. The adjusting of the position may be understood as adjusting of a value of the length h using the button 622, and may be implemented by software processing to adjust a relative displacement of the pointing position with respect to the markers 611 through 613, regardless of an actual length of the needle 614 or the position of the pointer 615. Also, the button 622 may be used to adjust a physical length of the needle 614 protruding outwardly. Accordingly, the user may adjust a distance between a user's hand and the pointing position, based on an application or a preference of the user. Furthermore, the button 622 may be implemented by a pressure sensor to sense a pressure. When the user heavily presses the button 622, interaction to allow the pointing position to be away from the user may be possible. FIG. 6D illustrates an example in which a user points to a position 606 of an object 605.

Figure 7A:
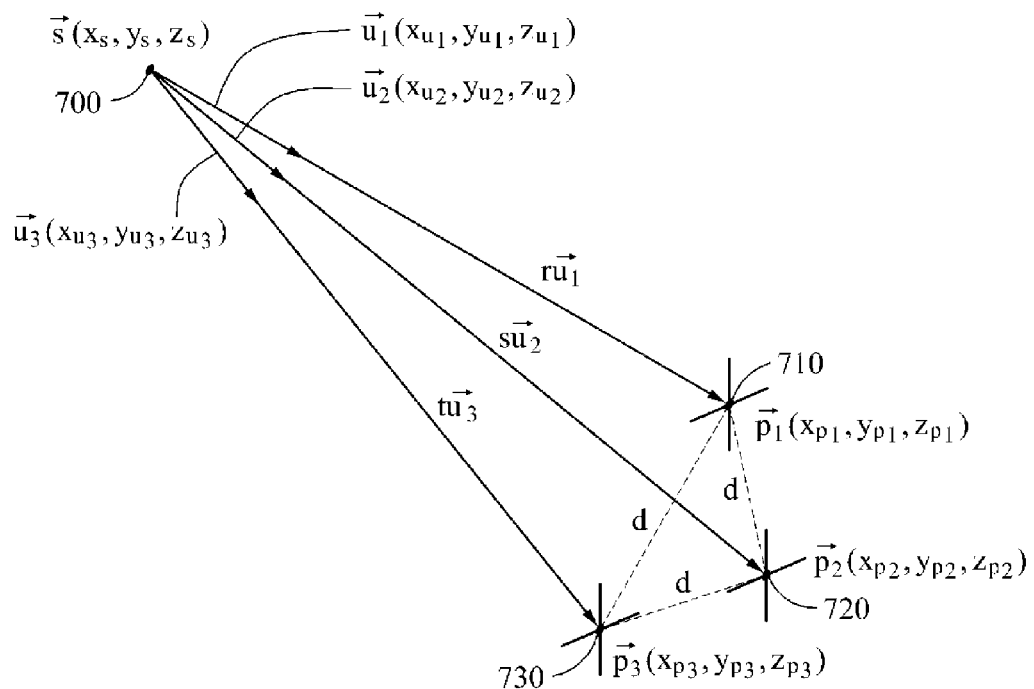
FIGS. 7A and 7B illustrate a process of calculating a pointing position in the pointing device of FIG. 6A.
Figure 7B:
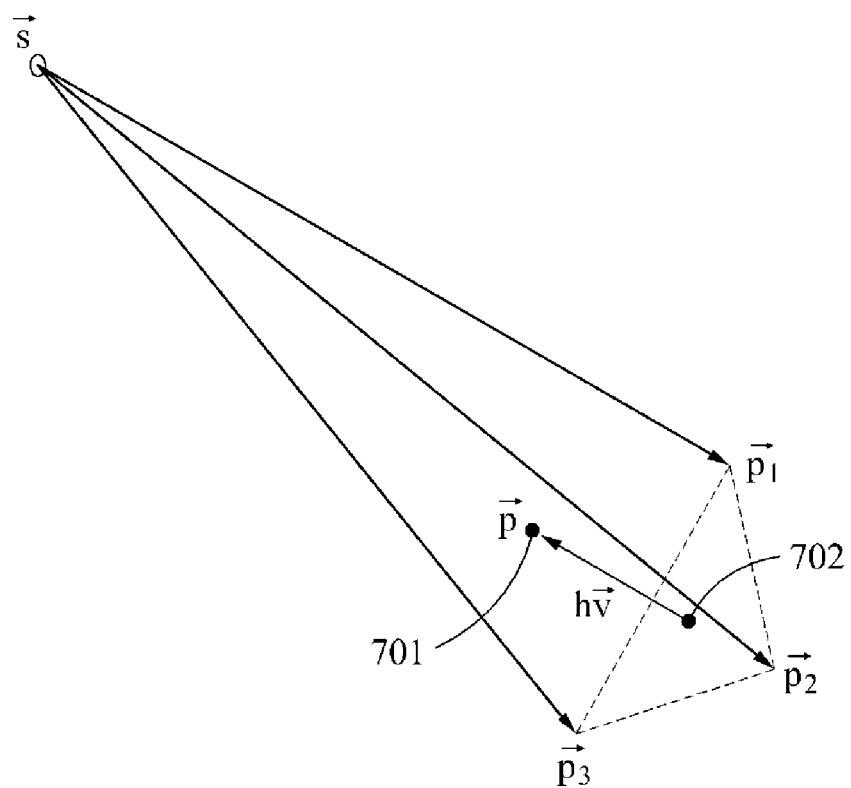

FIGS. 7A and 7B illustrate a process of calculating a pointing position in the pointing device 600 of FIG. 6A.

In FIG. 7A, a position vector of a position 700 of a camera may be expressed as s. A direction vector from the position 700 to a position 710 of a first marker, a direction vector from the position 700 to a position 720 of a second marker, and a direction vector from the position 700 to a position 730 of a third marker may be expressed as u1, u2, and u3, respectively. A position vector p1 of the first marker, a position vector p2 of the second marker, and a point vector p3 of the third marker may be expressed as shown in Equation 6 below. Additionally, distances between the position 700 and the positions 710 through 730 may be expressed as r, s, and t, respectively.

$$\vec{p}_1 = \vec{s} + r\vec{u}_1$$
$$\vec{p}_2 = \vec{s} + s\vec{u}_2$$
$$\vec{p}_3 = \vec{s} + t\vec{u}_3$$
[Equation 6]

The distances r, s, and t may be obtained by solving a simultaneous equation as shown in Equation 7 below.

$$|\vec{p}_1 - \vec{p}_2| = |r\vec{u}_1 - s\vec{u}_2| = d$$
$$|\vec{p}_2 - \vec{p}_3| = |s\vec{u}_2 - t\vec{u}_3| = d$$
$$|\vec{p}_3 - \vec{p}_1| = |t\vec{u}_2 - r\vec{u}_1| = d$$
[Equation 7]

When the position vectors $p_1$, $p_2$, and $p_3$ are obtained, a position vector p of the pointing position may be obtained. As shown in FIG. 7B, a position 701 of a pointer may be spaced apart by h from a central point 702 between positions of markers in a normal direction. A normal vector of a plane formed by the positions of the markers may be expressed as v. Referring to Equations 8 and 9, the position vector p may be obtained from the position vectors $p_1$, $p_2$, and $p_3$.

$$(\vec{p}_1 - \vec{p}_2) \cdot \vec{v} = 0$$
[Equation 8]

$$(\vec{p}_2 - \vec{p}_3) \cdot \vec{v} = 0$$

$$|\vec{v}| = 1$$

$$\vec{p} = h\vec{v} + \tfrac{1}{3}(\vec{p}_1 + \vec{p}_2 + \vec{p}_3)$$
[Equation 9]

The above-described pointing device may have various shapes. For example, a single marker, two markers, or at least four markers may be provided, instead of the three markers. In addition, pointing may be performed based on a marker-less image recognition. Hereinafter, an example of using a single marker will be described.

Figure 8A:
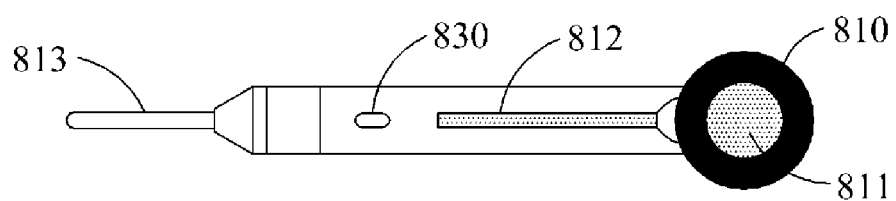
FIGS. 8A and 8B illustrate a structure and an operation of a pointing device according to at least one example embodiment.
Figure 8A:
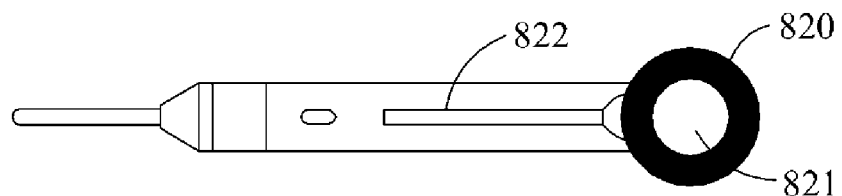
Figure 8B:
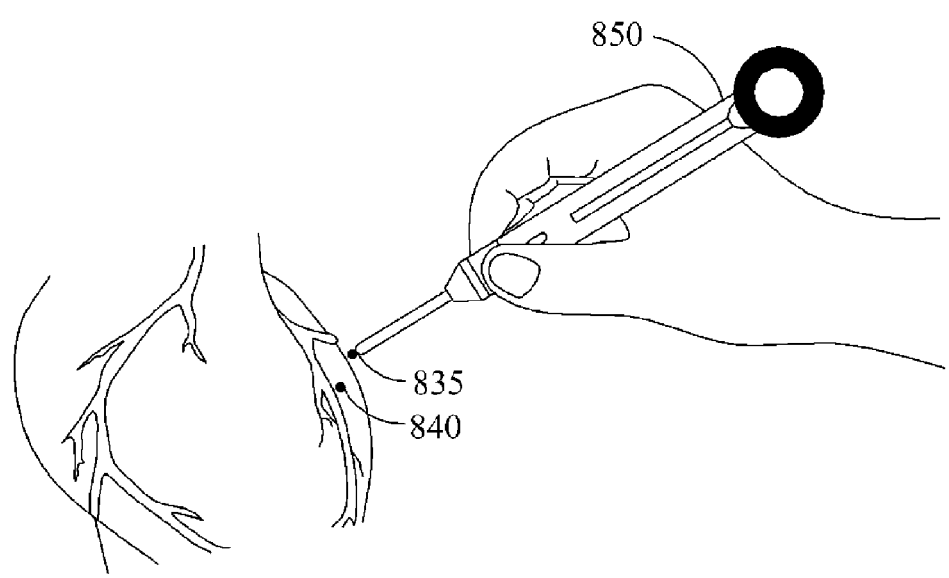

FIGS. 8A and 8B illustrate a structure and an operation of a pointing device according to at least one example embodiment.

The pointing device of FIG. 8A may have a shape similar to a pen or a surgical knife, and may be referred to as a pen-type pointing device. A circular identification element 811 may be disposed in a circular structure 810 in a rear portion of the pen-type pointing device. An identification element 812 may be additionally disposed on the same plane as the circular identification element 811. A needle 813 may be disposed in a front portion of the pen-type pointing device. A button 830 may function to control on/off of the pen-type pointing device. A state in which the button 830 is pressed may correspond to an on state of the pen-type pointing device, and a state in which the button 830 is not pressed may correspond to an off state of the pen-type pointing device. Activating the pen-type pointing device by pressing the button 830 may be transferred using radio waves. When the pen-type pointing device is turned on, LED light may be emitted from the circular identification element 811, and may be recognized by a camera. When the pen-type pointing device is turned off using the button 830, light of identification elements 821 and 822 in a rear portion 820 may be out. Referring to FIG. 8B, a user may operate a pointing device 850. A pointing position 835 may be recognized by a relative displacement from a desired (or alternatively, predesignated) identification element, and pointing to a position 840 of an object by an operation of the user may be sensed. Calculating of a pointing position will be further described with reference to FIGS. 9A and 9B.

Figure 9A:
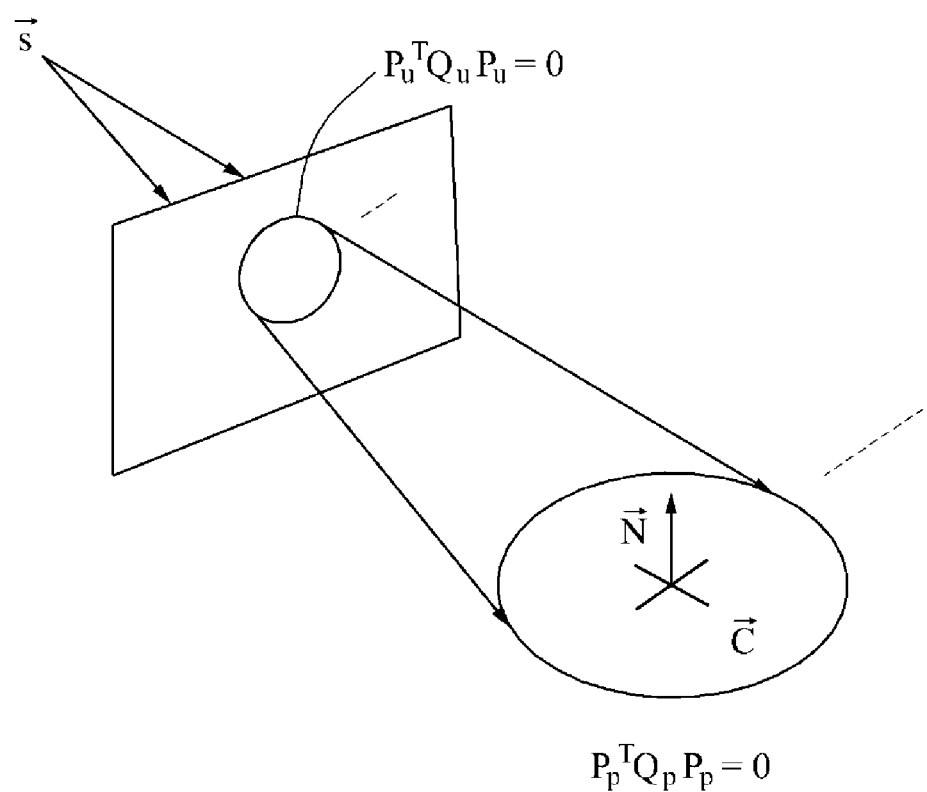
FIGS. 9A and 9B illustrate a process of calculating a pointing position in the pointing device of FIG. 8A.
Figure 9B:
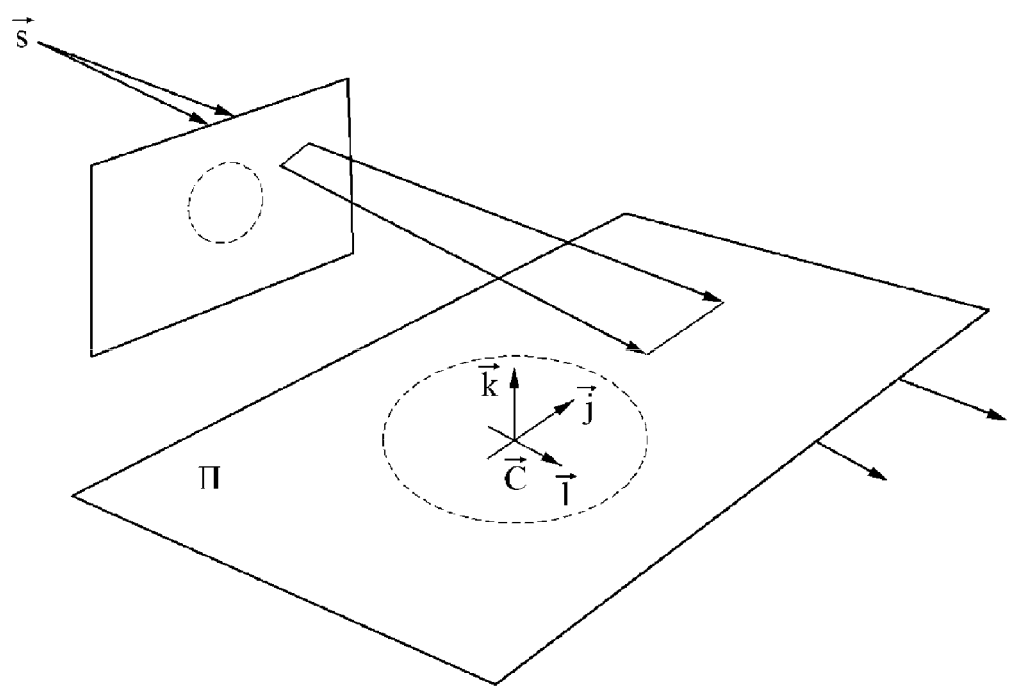

FIGS. 9A and 9B illustrate a process of calculating a pointing position in the pointing device of FIG. 8A. An identification element may have a shape, for example, a circle with a desired (or alternatively, predetermined) size, and/or a straight line on the same plane as a circle. Referring to FIG. 9A, a position of a center of a circle with a known size, and a normal vector N may be obtained using the circle.

In FIG. 9A, when an image is acquired by capturing a marker, that is, a circle with a known size in space, the marker may be projected as a circle or an oval on the image. A set of points forming the marker may be defined as Pp, and a set of points projected to a center of a camera on a plane of the image and back-projected may be defined as Pu, as shown in Equation 10 below.

$$P_u = k \begin{bmatrix} x_u \\ y_y \\ -f \end{bmatrix}$$
[Equation 10]

In Equation 10, xu and yu denote positions of points of the marker projected on the plane of the image, f denotes a focal distance of the camera, and k denotes a scale parameter. Because $P_p$ is defined as a circle and $P_u$ corresponds to as a circle or an oval, the sets may generally satisfy a quadratic curve equation, and elliptic matrices of the sets are denoted by $Q_p$ and $Q_u$, respectively.

$$P_p^T Q_p P_p = 0 \quad \text{[Equation 11]}$$

$$P_u^T Q_u P_u = 0$$

The circle in space, and the projected circle or oval may have the same point as the origin in a projection space and accordingly, $P_p$ and $P_u$ may have a relationship of rotation, and a rotation matrix is denoted by $R_p$. When $R_p P_p$ is substituted into $P_u$ in Equation 11, a relationship $Q_u$ and $Q_p$ may be obtained as shown in Equation 12 below.

$$P_u = R_p P_p \quad \text{[Equation 12]}$$
$$k R_p^T Q_u R_p = Q_p$$

$$Q_u = V \Lambda V \quad \text{[Equation 13]}$$
$$\begin{cases} \Lambda = \text{diag}\{\lambda_1, \lambda_2, \lambda_3\} \\ V = [v_1\ v_2\ v_3] \end{cases}$$

In Equation 13, $V \Lambda V$ denotes an eigen-decomposition applied to $Q_u$. $V$ denotes an eigenvector matrix. $\lambda_1$, $\lambda_2$, and $\lambda_3$ denote eigenvalues of $Q_u$, and $\Lambda$ denotes a diagonal matrix of eigenvalues. When Equation 13 is applied to Equation 12, a final rotation matrix $R$ may be expressed as shown in Equation 14 below.

$$k R_p^T V \Lambda V^T R_p = k R^T \Lambda^T R = Q_p \quad \text{[Equation 14]}$$
$$R = V^T R_p$$

$$R = V \begin{bmatrix} \cos\alpha \sqrt{\frac{\lambda_2 - \lambda_3}{\lambda_1 - \lambda_3}} & s_1 \sin\alpha \sqrt{\frac{\lambda_2 - \lambda_3}{\lambda_1 - \lambda_3}} & s_2 \sqrt{\frac{\lambda_1 - \lambda_2}{\lambda_1 - \lambda_3}} \\ \sin\alpha & -s_1 \cos\alpha & 0 \\ s_1 s_2 \cos\alpha \sqrt{\frac{\lambda_1 - \lambda_2}{\lambda_1 - \lambda_3}} & s_2 \sin\alpha \sqrt{\frac{\lambda_1 - \lambda_2}{\lambda_1 - \lambda_3}} & -s1 \sqrt{\frac{\lambda_2 - \lambda_3}{\lambda_1 - \lambda_3}} \end{bmatrix} \quad \text{[Equation 15]}$$

Accordingly, a normal vector N and a position vector C of a central point may be obtained, as shown in Equations 16 and 17 below. The normal vector N and the position vector C are two solutions and accordingly, a common solution may be obtained using a concentric circle in order to avoid ambiguity.

$$\vec{N} = V \begin{bmatrix} s_2 \sqrt{\frac{\lambda_1 - \lambda_2}{\lambda_1 - \lambda_3}} \\ 0 \\ -s_1 \sqrt{\frac{\lambda_2 - \lambda_3}{\lambda_1 - \lambda_3}} \end{bmatrix} \quad \text{[Equation 16]}$$

$$\vec{C} = s_3 \frac{\lambda_2 r}{\sqrt{-\lambda_1 \lambda_3}} V \begin{bmatrix} s_2 \frac{\lambda_3}{\lambda_2} \sqrt{\frac{\lambda_1 - \lambda_2}{\lambda_1 - \lambda_3}} \\ 0 \\ -s_1 \frac{\lambda_1}{\lambda_2} \sqrt{\frac{\lambda_2 - \lambda_3}{\lambda_1 - \lambda_3}} \end{bmatrix} \quad \text{[Equation 17]}$$

FIG. 9B provides a scheme of obtaining a rotation value using a straight line on the same plane as a circle, to obtain pose and/or position of the pointing device. An exact rotation value may be acquired using a straight line that is drawn toward a center of a circle on the same plane as the circle. Calculating of rays in the circle will be described.

$$w \begin{bmatrix} x_p \\ y_p \\ 1 \end{bmatrix} = K^{-1} \begin{bmatrix} x_u \\ y_u \\ 1 \end{bmatrix} \quad \text{[Equation 18]}$$

In Equation 18, coordinates [xp, yp, 1] is obtained by transforming to camera coordinates by multiplying image coordinates [xu, yu, 1] of a point on a straight line by an inverse matrix of a camera intrinsic parameter, and by normalizing a value of a z-axis to "1," and w denotes a scale parameter of the coordinates. In FIG. 9B, the straight line on the plane may have various spatial coordinate values based on a value of the scale parameter w, and the scale parameter w may be searched for from among the spatial coordinate values so that a straight line may exist on a plane Π including an actual marker. To determine whether a back-projected point exists on the plane Π, an inner product of a straight line connecting w[xp,yp,1] and a point c on the plane and a normal vector n may be obtained. When the inner product has a value of "0," the normal vector n and (c−w[xp,yp,1]) may be in a vertical relationship and accordingly, w[$x_p$,$y_p$,1] may be on the plane Π.

$$w = \frac{n_1 c_1 + n_2 c_2 + n_3 c_3}{n_1 x_p + n_2 y_p + n_3} \quad \text{[Equation 19]}$$

In Equation 19, $n_1$, $n_2$ and $n_3$ denote values of the normal vector n of the plane Π for x-, y- and z-axes, respectively, and $c_1$, $c_2$ and $c_3$ denote values of the point c for x-, y- and z-axes, respectively.

$$\vec{i} = \vec{j} \times \vec{k} \quad \text{[Equation 20]}$$

$$\vec{j} = w \begin{bmatrix} x_p \\ y_p \\ 1 \end{bmatrix} - \vec{C}$$

$$\vec{k} = \vec{N}$$

Based on the above equations, when a straight line on the same plane Π as a circle is projected onto an image, a point positioned at ($x_u$, $y_u$) on the straight line may be back-projected. A point at which a back-projected ray meets the plane Π may be set as a j-axis of a center of the circle. A direction of the normal vector N may be set as a k-axis, and an i-axis may be determined through an outer product of the j-axis and the k-axis. A 3×3 matrix having the above three axes as column vectors may be used as a rotation matrix of a model of camera coordinates (for example, a circular identification element). Based on a pose value and a distance of the model of the camera coordinates, a pose and a final position of a pointing tip may be estimated.

Figure 10A:
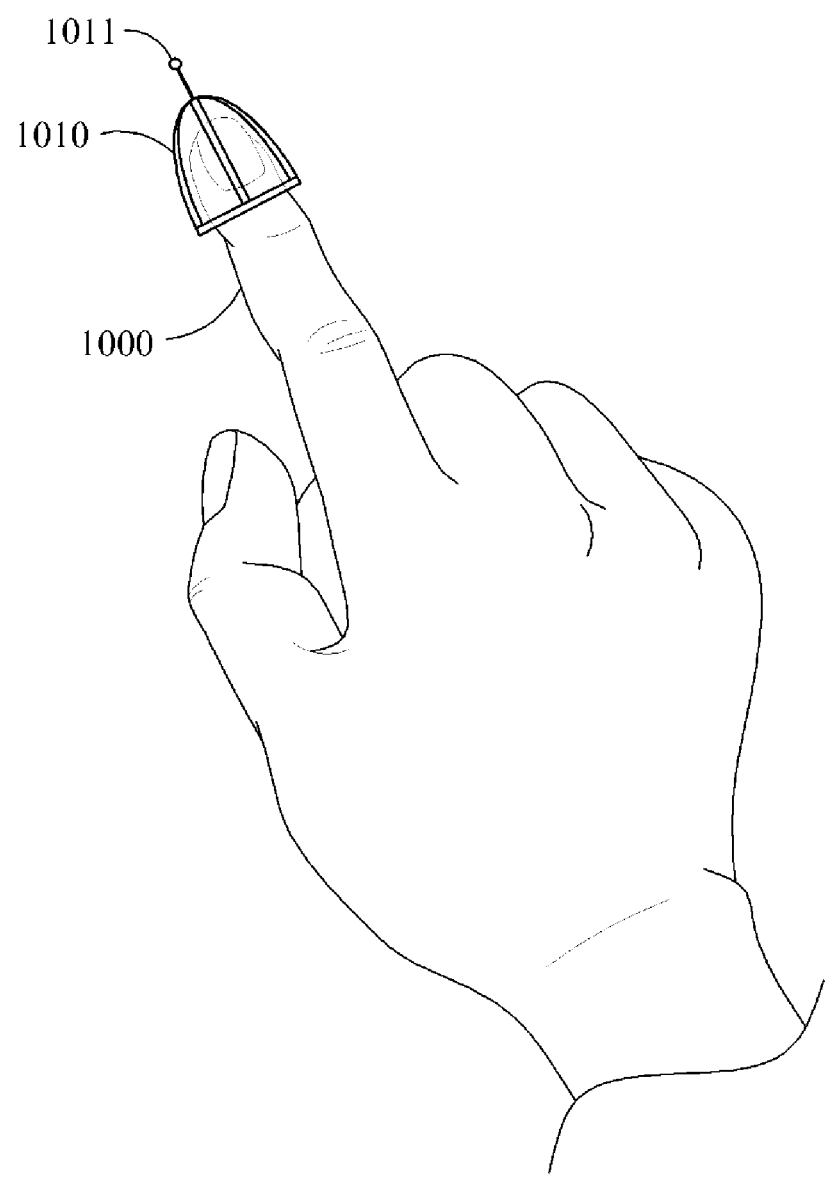
FIGS. 10A and 10B illustrate a structure and an application of a pointing device according to at least one example embodiment.
Figure 10B:
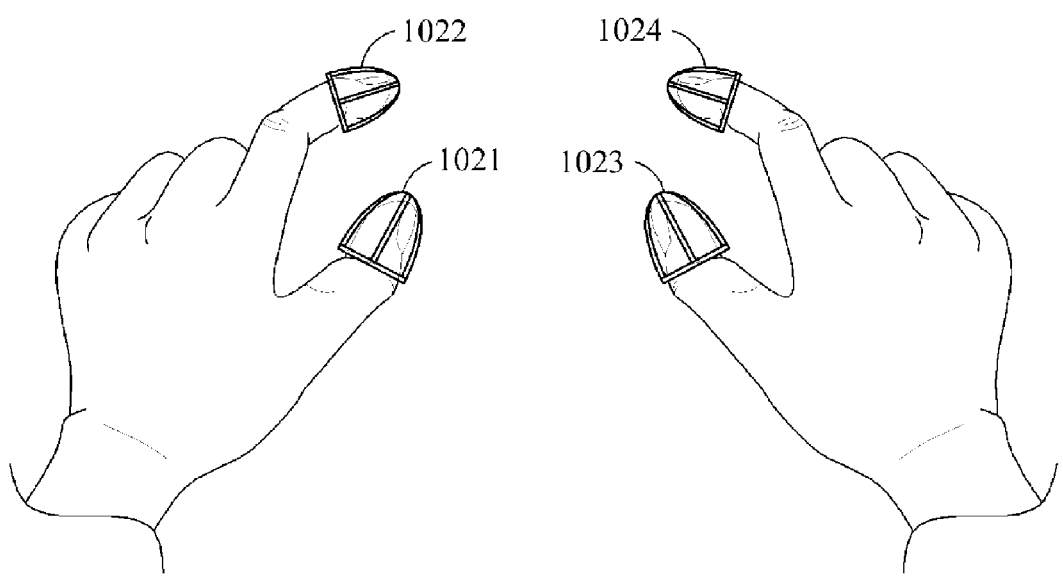

FIGS. 10A and 10B illustrate a structure and an application of a pointing device according to at least one example embodiment. In FIG. 10A, a pointing device 1010 may be putted on a finger 1000 of a human. A user may adjust a pointing position in a space, using a pointer 1011 mounted on a needle tip. The pointing device 1010 may include a plurality of markers. In FIG. 10B, a plurality of pointing devices, for example pointing devices 1021, 1022, 1023 and 1024, may be used. Each of the pointing devices 1021, 1022, 1023 and 1024 may have an identification element that is distinguished from another identification element and accordingly, four independent positions may be determined as pointing positions. Accordingly, it is possible to more intuitively provide an interaction, for example, grabbing an object, changing a shape of the object, or moving the object.

Figure 11:
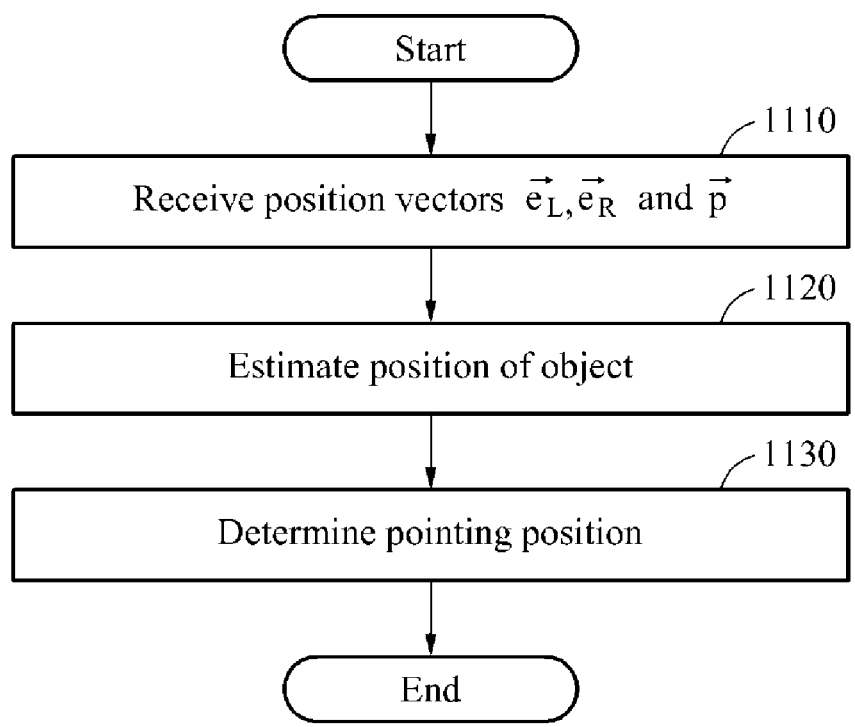
FIG. 11 is a flowchart illustrating a computing method according to at least one example embodiment.

FIG. 11 is a flowchart illustrating a computing method according to at least one example embodiment. It should be understood that the computing apparatus 100 and/or computing apparatus 101 may perform the method illustrated in FIG. 11.

Referring to FIG. 11, in operation 1110, position vectors eL and eR of both eyes of a user may be received, and a position vector p of a pointing position obtained by estimating the pointing position may be received. For example, the position vector p may be input, or may be directly calculated. The process of calculating the position vector p has been described with reference to FIGS. 5B through 9B.

In operation 1120, a position o of an object may be estimated. An object position estimator may calculate a position of an object recognized by the user, using positions of both the eyes and a position of an object point displayed on an image. Estimating of the position of the object has been described above with reference to FIGS. 3 through 4B. As described above with reference to FIG. 1, a process of estimating the position of the object may be understood as coordinate movement or coordinate transformation. Coordinates of an object point in fixed global coordinates may be transformed to coordinates in a user recognition coordinate system changed based on positions of both eyes of a user. Additionally, the estimating of the position of the object may be understood as a process of searching for a transformation function associated with the coordinate transformation.

In operation 1130, a pointing determiner may determine a pointing position by comparing coordinates of the pointing position to coordinates of the object point that is transformed to the user recognition coordinate system. As described above with reference to FIG. 1, the above process may also be understood that the pointing determiner searches for a pointing position in a global coordinate system by applying an inverse function to the transformation function of a pointing position in the user recognition coordinate system and determines whether pointing is performed based on a difference between coordinate values. Various examples associated with the process have been described above with reference to FIGS. 1 through 9B.

The units and/or modules described herein may be implemented using hardware components, software components, or a combination thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor (i.e., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computing apparatus, comprising:
a memory and a processor, the memory configured to store instructions that, when executed by the processor, configures the processor to,
calculate first coordinate values based on a position of each of a left eye and a right eye of a user and a position of an object point on an image, the first coordinate values representing the position of the object point as recognized by the user,
determine whether a pointing position of the user corresponds to the object point based on the first coordinate values and second coordinate values, the second coordinate values representing the pointing position, and
calculate the second coordinate values based on directions of a plurality of markers corresponding to at least one identification element associated with a user device, the directions of the plurality of markers recognized by image-sensing and displacement information between the plurality of markers.

2. The computing apparatus of claim 1, wherein the processor is configured to correct a position of the at least one identification element sensed in a current frame based on a position of the at least one identification element sensed in at least one previous frame, and configured to calculate the second coordinate values based on the corrected position.

3. The computing apparatus of claim 1, wherein the processor is configured to correct coordinate values calculated in a current frame based on coordinate values calculated in at least one previous frame preceding the current frame, and configured to determine the corrected coordinate values as the second coordinate values.

4. The computing apparatus of claim 1,
the processor is configured to calculate the second coordinate values by comparing a first shape and a second shape, the first shape being recognized by image-sensing as at least one identification element associated with a user device, the second shape being given in advance as a shape of the at least one identification element.

5. The computing apparatus of claim 4, wherein the at least one identification element comprises a light source switchable between an on state and an off state by a switch included in the user device, and is recognizable or unrecognizable based on a state of the light source.

6. The computing apparatus of claim 1,
the processor is configured to calculate a position of at least one identification element associated with a user device, and configured to calculate the second coordinate values based on a relative displacement between the pointing position and the at least one identification element.

7. The computing apparatus of claim 6, wherein the relative displacement is changeable by an operation of the user.

8. The computing apparatus of claim 7, wherein the operation of the user to change the relative displacement is identified by an operation of a wheel included in the user device.

9. The computing apparatus of claim 7, wherein the operation of the user to change the relative displacement is identified by a sensing value of a pressure sensor included in the user device.

10. A computing apparatus, comprising:
a camera configured to determine positions of eyes of a user; and
a memory and a processor, the memory configured to store instructions that, when executed by the processor, configures the processor to,
determine a transformation function based on the positions of the eyes of the user, the transformation function being used to transform coordinate values of an object point in a global coordinate system to first coordinate values in a user recognition coordinate system, the object point being a point on an image, the point being estimated based on the positions of the eyes of the user, and
determine whether a pointing position of the user corresponds to the object point based on the first coordinate values and second coordinate values, the second coordinate values representing the pointing position.

11. The computing apparatus of claim 10, wherein if a distance between the first coordinate values and the second coordinate values is less than a threshold, the processor is configured to determine that the pointing position corresponds to the object point.

12. A computing apparatus, comprising:
a camera configured to determine positions of eyes of a user; and
a memory and a processor, the memory configured to store instructions that, when executed by the processor, configures the processor to,
determine a transformation function based on the positions of the eyes of the user, the transformation function being used to transform initial coordinate values of an object point in a global coordinate system to first coordinate values in a user recognition coordinate system, the object point being a point on an image, the point being estimated based on the positions of the eyes of the user,
determine third coordinate values in the global coordinate system by applying an inverse function to the transformation function of second coordinate values representing a pointing position of the user, and
determine whether the pointing position corresponds to the object point based on the first coordinate values and the third coordinate values.

13. A method by which a computing apparatus including at least one processor provides a three-dimensional (3D) interactive user experience, the method comprising:
calculating, by the at least one processor, first coordinate values based on positions of eyes of a user and a position of an object point displayed on an image, the first coordinate values being recognized by the user as the position of the object point;
calculating, by the at least one processor, second coordinate values representing a pointing position of the user, the calculating the second coordinate values including,
correcting a position of at least one identification element sensed in a current frame based on a position of the at least one identification element sensed in at least one previous frame, the at least one identification element being associated with a user device, and
calculating the second coordinate values based on the corrected position; and determining, by the at least one processor, whether the pointing position corresponds to the object point based on the first coordinate values and the second coordinate values.

14. The method of claim 13, wherein the pointing position and the positions of the eyes are calculated from an image captured by a single camera.

15. A device, comprising:
a memory and a processor, the memory configured to store instructions that, when executed by the processor, configures the processor to,
estimate a position of an object point on an image based on i) a position of each of a left eye and a right eye of a user in a user coordinate system, and ii) a position of the object point in a global coordinate system, the user coordinate system being from a different perspective than the global coordinate system,
determine whether a pointing position of the user corresponds to the object point based on the estimated position, the image being a stereoscopic image comprising a right image and a left image,
determine, as the estimated position of the object point, coordinates of an intersection point at which a first straight line connecting the position of the left eye and a position of the object point on the left image intersects a second straight line connecting the position of the right eye and a position of the object point on the right image, if the first straight line and the second straight line intersect, and
determine, as the estimated position of the object point, coordinates of a central point of a line segment perpendicular to the first straight line and the second straight line, if the first straight line and the second straight line do not intersect.

16. The device of claim 15, wherein the user coordinate system is from the perspective of the user and the global coordinate system is from the perspective of a display displaying the image.

17. The device of claim 15, wherein if a difference between the estimated position of the object point and the pointing position is less than a threshold, the pointing position determiner is configured to determine that the pointing position corresponds to the object point, and to initiate a user desired operation on the object point.

18. The device of claim 15, further comprising:
a camera configured to capture the position of each of a left eye and a right eye of the user and the pointing position of the user.

* * * * *